(12) United States Patent
Yu (10) Patent No.: US 11,032,236 B2
(45) Date of Patent: Jun. 8, 2021

(54) TECHNOLOGIES FOR CONTENT DELIVERY NETWORK WITH MULTI-ACCESS EDGE COMPUTING

(71) Applicant: INTEL CORPORATION, Santa Clara (CA)

(72) Inventor: Yifan Yu, Haidian District (CN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/957,294

(22) PCT Filed: Mar. 31, 2018

(86) PCT No.: PCT/CN2018/081483
§ 371 (c)(1),
(2) Date: Jun. 23, 2020

(87) PCT Pub. No.: WO2019/183978
PCT Pub. Date: Oct. 3, 2019

(65) Prior Publication Data
US 2021/0029075 A1   Jan. 28, 2021

(51) Int. Cl.
*H04L 29/12* (2006.01)
*H04L 29/08* (2006.01)
*H04L 29/06* (2006.01)

(52) U.S. Cl.
CPC ...... *H04L 61/1511* (2013.01); *H04L 61/6013* (2013.01); *H04L 65/4069* (2013.01);
(Continued)

(58) Field of Classification Search
None
See application file for complete search history.

(56) References Cited

U.S. PATENT DOCUMENTS 8,399,073 B2 *  3/2013  Klasen-Memmer .................. C09K 19/3001
                                                                    428/1.1
8,504,655 B1 *  8/2013  Bertz .................... H04L 63/104
                                                                    709/219
(Continued)

FOREIGN PATENT DOCUMENTS

| CN | 104796469 | 7/2015 |
| CN | 104935521 | 9/2015 |
| CN | 107026758 | 8/2017 |

OTHER PUBLICATIONS

PCT Search Report and Written Opinion prepared for PCT/CN2018/081483, completed Dec. 12, 2018.

*Primary Examiner* — Lashonda T Jacobs
(74) *Attorney, Agent, or Firm* — Hanley, Flight & Zimmerman, LLC (57) ABSTRACT

Technologies for mobile content delivery include an edge computing device, a mobile terminal, and a content delivery network server. The edge computing device has a network location between the mobile terminal and a core network, and the content delivery network server is accessed through the core network. The edge computing device receives a content request from the mobile terminal and modifies the content request to identify the network location of a zone-specific proxy of the edge computing device. The edge computing device forwards the content response to the content delivery network server. The content delivery network server may send a content response to the zone-specific proxy or the mobile terminal. The content response identifies an address of a network content resource. The network content resource is located at a surrogate content delivery network server of the edge computing device. Other embodiments are described and claimed.

24 Claims, 5 Drawing Sheets

(52) U.S. Cl.
CPC .......... *H04L 65/4084* (2013.01); *H04L 67/02* (2013.01); *H04L 67/10* (2013.01); *H04L 67/1002* (2013.01); *H04L 67/18* (2013.01); *H04L 67/28* (2013.01)

(56) References Cited

U.S. PATENT DOCUMENTS

| | | | | |
|---|---|---|---|---|
| 8,527,582 | B2* | 9/2013 | Walsh | H04L 63/102 709/203 |
| 8,539,099 | B2* | 9/2013 | Hilt | H04L 69/163 709/238 |
| 9,060,031 | B1* | 6/2015 | Taylor | G06F 21/6254 |
| 9,325,662 | B2* | 4/2016 | Luna | H04L 61/6009 |
| 9,641,591 | B1* | 5/2017 | Kolam | H04L 67/1014 |
| 9,712,484 | B1* | 7/2017 | Richardson | H04L 61/305 |
| 9,860,339 | B2* | 1/2018 | Shaw | H04L 41/5041 |
| 10,182,098 | B2* | 1/2019 | Natarajan | H04L 65/80 |
| 10,206,094 | B1* | 2/2019 | Wen | H04W 4/50 |
| 10,397,106 | B2* | 8/2019 | Leach | H04L 45/70 |
| 10,517,020 | B2* | 12/2019 | Wen | H04W 36/0061 |
| 10,735,528 | B1* | 8/2020 | Shafiullah | H04L 65/1066 |
| 10,742,754 | B2* | 8/2020 | Wistow | H04L 67/2804 |
| 10,880,232 | B1* | 12/2020 | Goodman | G06F 16/29 |
| 2001/0037292 | A1* | 11/2001 | Vogt | G06Q 20/04 705/39 |
| 2010/0070603 | A1* | 3/2010 | Moss | H04L 67/2842 709/207 |
| 2010/0111059 | A1* | 5/2010 | Bappu | H04N 21/4331 370/338 |
| 2010/0125673 | A1* | 5/2010 | Richardson | H04L 45/741 709/239 |
| 2012/0179787 | A1* | 7/2012 | Walsh | H04L 63/0281 709/219 |
| 2014/0108474 | A1* | 4/2014 | David | G06F 16/182 707/827 |
| 2014/0185881 | A1* | 7/2014 | Nakamura | G06T 7/223 382/107 |
| 2016/0380883 | A1 | 12/2016 | Shaw et al. | |
| 2017/0086049 | A1* | 3/2017 | Vrzic | H04W 40/00 |
| 2017/0142179 | A1* | 5/2017 | Appelquist | H04N 21/2343 |
| 2017/0201571 | A1* | 7/2017 | Sherf | H04L 43/0817 |
| 2017/0366618 | A1* | 12/2017 | Vrzic | H04L 67/148 |
| 2018/0109590 | A1* | 4/2018 | Rao | H04L 67/327 |
| 2018/0263039 | A1* | 9/2018 | Fang | H04W 72/0486 |
| 2019/0261260 | A1* | 8/2019 | Dao | H04W 36/0009 |
| 2019/0319858 | A1* | 10/2019 | Das | H04L 43/08 |
| 2019/0387062 | A1* | 12/2019 | Enat | H04L 67/148 |
| 2020/0186613 | A1* | 6/2020 | Johns | H04L 61/609 |

* cited by examiner

TECHNOLOGIES FOR CONTENT DELIVERY NETWORK WITH MULTI-ACCESS EDGE COMPUTING

CROSS REFERENCE TO RELATED APPLICATIONS

The present application is a national stage entry under 35 USC § 371(b) of International Application No. PCT/CN2018/081483, filed Mar. 31, 2018.

BACKGROUND

Increasingly, network functions traditionally performed by dedicated hardware devices are being performed using general-purpose computers, such as server computers that include one or more Intel® Xeon® processors. For example, network functions such as routing, packet filtering, caching, and other network functions may be executed by a virtualization platform, which may include any combination of network function virtualization (NFV), software-defined networking (SDN), and/or software-defined infrastructure (SDI).

Content providers may use content delivery networks (CDNs) to position content in servers that are closer to an end-user device. Typical CDNs may deliver data to servers outside of a mobile network, for example in network backbones directly connected to or peered with the mobile network. CDNs typically do not have access to detailed information about the network location of an end-user device, such as a mobile terminal.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
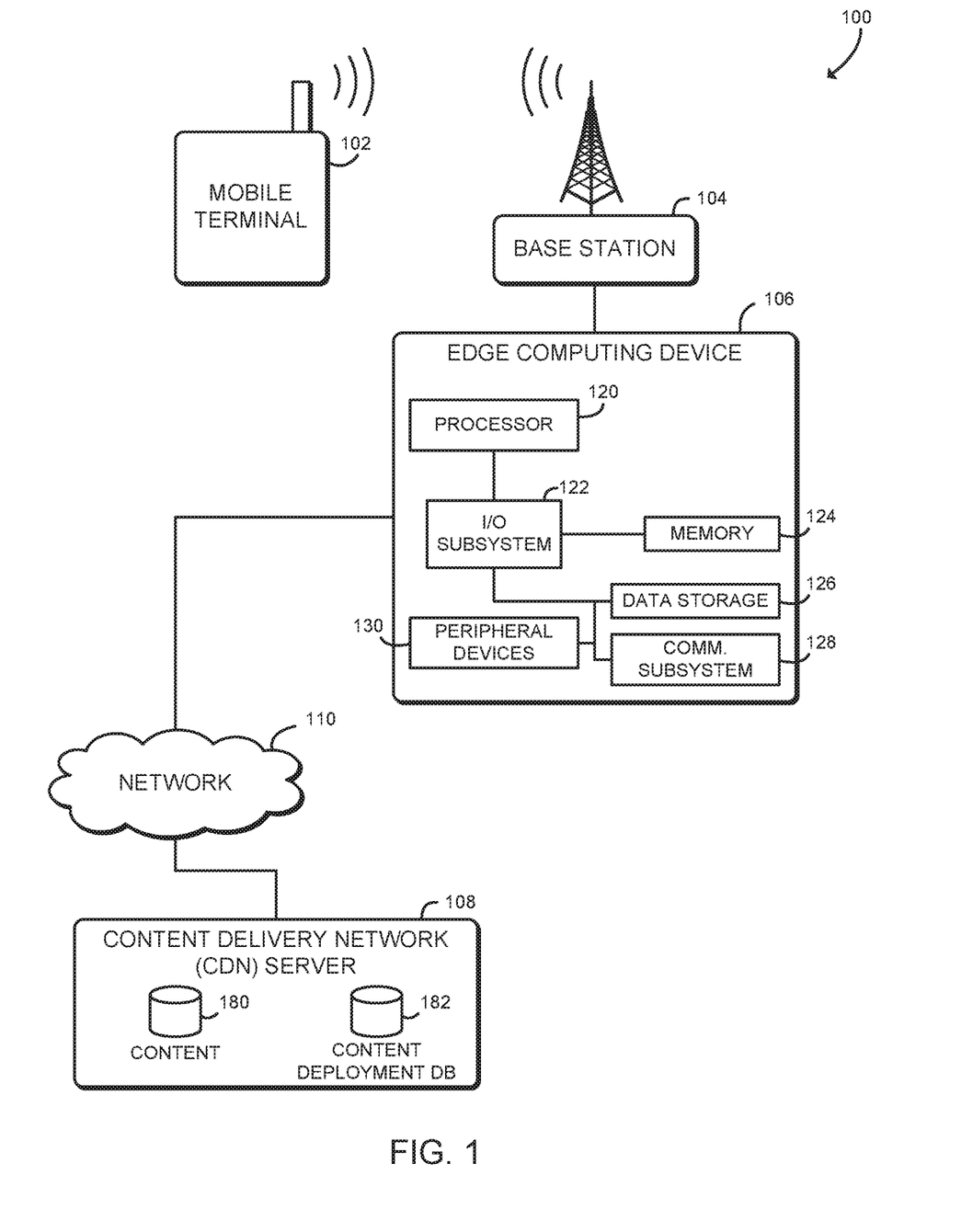
FIG. 1 is a simplified block diagram of at least one embodiment of a system for a content delivery network with multi-access edge computing.

Referring now to FIG. 1, in an illustrative embodiment, a system 100 for content delivery with multi-access edge computing includes a mobile terminal 102 that communicates wirelessly with a base station 104. The base station 104 is coupled to an edge computing device 106, which communicates with a content delivery network (CDN) server 108 over a network 110, such as a wireless operator core network. The mobile terminal 102 sends content requests that are processed by a zone-specific proxy of the edge computing device 106. The zone-specific proxy modifies the content request to identify the network location of the zone-specific proxy and then forwards the modified content request to the CDN server 108. The CDN server 108 identifies a surrogate CDN server that is also hosted by the edge computing device 106 and provides an appropriate content response. By hosting content in the mobile edge of the network, the system 100 may significantly reduce end-to-end latency for content accesses as compared to content delivery networks located outside of the mobile edge. For example, the system 100 may provide content access with latency of about 15 milliseconds as compared to latencies of about 80 milliseconds that may be achievable with typical CDN systems. Accordingly, the system 100 may provide an improved experience for low-latency applications such as virtual reality or augmented reality. Additionally, the system 100 may allow for improved latency without requiring architectural modifications of the CDN server 108 or other elements of the CDN system. For example, with the system 100 the CDN system may use a global server load balance (GSLB) distribution management component, and is not required to establish or configure zone-specific domain name service (DNS) servers within the mobile network. Further, by using the zone-specific proxy of the system 100, the CDN system may not be required to track all service sessions associated with every mobile terminal 102, which may improve scalability for large traffic volumes. Additionally, the system 100 may improve latency by providing information on the network location of the mobile terminal (e.g., the location in a network topology of the mobile terminal 102, base station 104, edge computing device 106, etc.) as compared to the geographic location of the mobile terminal 102. Additionally, because the CDN determination is based on the network location of the zone-specific proxy, the system 100 may provide improved latency when the mobile terminal 102 changes its access point (e.g., base station 104) without changing its IP address.

The edge computing device 106 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the edge computing device 106 illustratively include a processor 120, an input/output subsystem 122, a memory 124, a data storage device 126, and a communication subsystem 128, and/or other components and devices commonly found in a server or similar computing device. Of course, the edge computing device 106 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the edge computing device 106, such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the edge computing device 106. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the edge computing device 106, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the edge computing device 106 may be embodied as any network interface controller or other communication circuit, device, or collection thereof, capable of enabling communications between the edge computing device 106 and other remote devices over a network. The communication subsystem 128 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the edge computing device 106 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

The mobile terminal 102 may be embodied as any type of computation or computer device capable of performing the functions described herein, including, without limitation, a mobile computing device, a smartphone, a wearable computing device, a tablet computer, a laptop computer, a notebook computer, a cellular phone, and/or a consumer electronic device. As such, the mobile terminal 102 may include components and features similar to the edge computing device 106, such as a processor 120, I/O subsystem 122, memory 124, data storage 126, communication subsystem 128, and various peripheral devices 130. Those individual components of the mobile terminal 102 may be similar to the corresponding components of the edge computing device 106, the description of which is applicable to the corresponding components of the mobile terminal 102 and is not repeated for clarity of the present description.

As shown, the mobile terminal 102 communicates wirelessly with the base station 104. For example, the mobile terminal 102 may communicate with the base station 104 using a cellular networking protocol such as 3G, LTE, GSM, CDMA, 4G, 5G, or other protocol. The base station 104 may be embodied as any type of computation or computer device capable of performing the functions described herein. Thus, the base station 104 may include an antenna, transceiver, radio node, and/or other wireless communication equipment for communicating with one or more mobile terminals 102.

As shown, the base station 104 is coupled to the edge computing device 106. The edge computing device 106 is included in a network edge and thus has a network location close to the base station 104. For example, the edge computing device 106 may connected to the base station 104 with relatively few intermediate network devices (e.g., switches, routers, gateways, bridges, or other network devices). Accordingly, the edge computing device 106 may be capable of communicating with the base station 104 (and the associated mobile terminal 102) with relatively low network latency. The edge computing device 106 may also be physically close to the base station 104, for example being co-located in the same facility, rack, or other location. That physical proximity may also reduce latency. Although illustrated as separate devices 104, 106, it should be understood that in some embodiments the functions of the base station 104 and the edge computing device 106 may be performed by a single device. For example, in some embodiments the base station 104 and the edge computing device 106 may be embodied as a single server device. Additionally or alternatively, it should be understood that in some embodiments the edge computing device 106 may be coupled with multiple base stations 104 and capable of servicing multiple mobile terminals 102. For example, the edge computing device 106 may be embodied as or included in an aggregation point that is connected to multiple base stations 104.

The CDN server 108 hosts content 180, which may include video content, audio content, virtual reality content, augmented reality content, or other content that may be accessed by the mobile terminal 102. The CDN server 108 also includes a content deployment database 182. As described further below, the CDN server 108 may use the content deployment database 182 to process content requests that originate from the mobile terminal 102 and provide content responses that identify a surrogate server close to the mobile terminal 102 that can provide the content 180. The CDN server 108 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As such, the CDN server 108 may include components and features similar to the edge computing device 106, such as a processor 120, I/O subsystem 122, memory 124, data storage 126, communication subsystem 128, and various peripheral devices 130. Those individual components of the CDN server 108 may be similar to the corresponding components of the edge computing device 106, the description of which is applicable to the corresponding components of the CDN server 108 and is not repeated for clarity of the present description.

As discussed in more detail below, the edge computing device 106 and the CDN server 108 may be configured to transmit and receive data with each other and/or other devices of the system 100 over the network 110. The network 110 may be embodied as any number of various wired and/or wireless networks. For example, the network 110 may be embodied as, or otherwise include, a wireless operator core network, a wired or wireless local area network (LAN), and/or a wired or wireless wide area network (WAN). As such, the network 110 may include any number of additional devices, such as additional computers, routers, and switches, to facilitate communications among the devices of the system 100. In the illustrative embodiment, the CDN server 108 has a network location that is relatively far from the base station 104 as compared to the location of the edge computing device 106 (e.g., the CDN server 108 is accessible through the operator core network and/or the public Internet).

Figure 2:
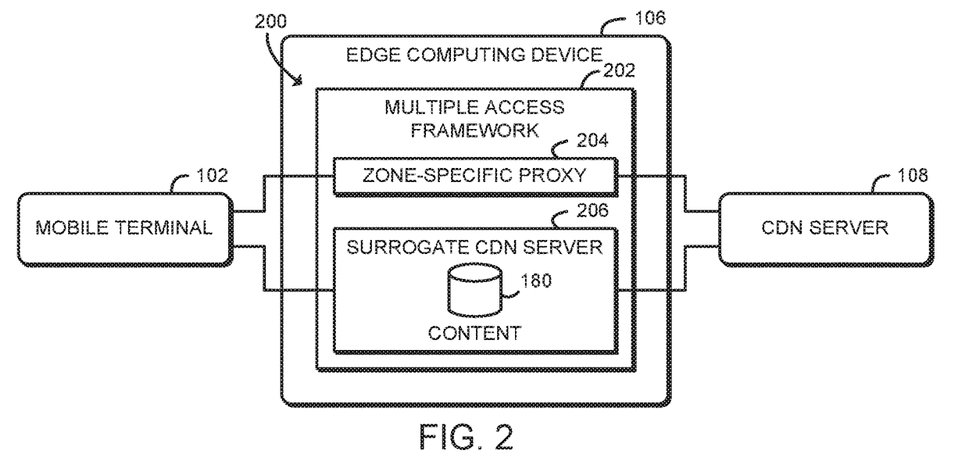
FIG. 2 is a simplified block diagram of at least one embodiment of an environment that may be established by an edge computing device of FIG. 1.

Referring now to FIG. 2, in an illustrative embodiment, the edge computing device 106 establishes an environment 200 during operation. The illustrative environment 200 includes a multiple access framework 202, which manages a zone-specific proxy 204 and a surrogate CDN server 206. The various components of the environment 200 may be embodied as hardware, firmware, software, or a combination thereof. As such, in some embodiments, one or more of the components of the environment 200 may be embodied as circuitry or collection of electrical devices (e.g., multiple access framework circuitry 202, zone-specific proxy circuitry 204, and/or surrogate CDN server circuitry 206). It should be appreciated that, in such embodiments, one or more of the multiple access framework circuitry 202, the zone-specific proxy circuitry 204, and/or the surrogate CDN server circuitry 206 may form a portion of one or more of the processor 120, the I/O subsystem 122, the communication subsystem 128, and/or other components of the edge computing device 106. Additionally, in some embodiments, one or more of the illustrative components may form a portion of another component and/or one or more of the illustrative components may be independent of one another.

The multiple access framework 202 may be embodied as or otherwise include a hypervisor, virtual machine monitor (VMM), or other component that manages execution of one or more virtualized workloads on the edge computing device 106. Each of the zone-specific proxy 204 and the surrogate CDN server 206 may be embodied as virtual machines (VMs), virtual network functions (VNFs), or other virtualized workloads that may be executed by the edge computing device 106. In some embodiments, the multiple access framework 202, the zone-specific proxy 204, and the surrogate CDN server 206 may implement and/or use components or services that implement or more multi-access edge computing (MEC) specifications published by the European Telecommunication Standards Institute (ETSI). For example, the edge computing device 106 may be a mobile edge host, and the multiple access framework 202 may be a mobile edge platform and virtualization infrastructure. Similarly, the zone-specific proxy 204 and the surrogate CDN server 206 may each be mobile edge applications and/or mobile edge services.

The multiple access framework 202 is configured to receive content requests from the mobile terminal 102. Each content request is associated with an identifier of a network content resource of the content 180. For example, the content request may include a URI, URL, or other identifier of the content resource. The multiple access framework 202 is further configured to route the content request to the zone-specific proxy 204. The multiple access framework 202 may be further configured to receive content accesses from the mobile terminal 102. Each content access is associated with an address of the network content resource, such as an internet protocol (IP) address, media access control (MAC) address, or other network address. The multiple access framework is configured to route the content access to the surrogate CDN server 206.

The zone-specific proxy 204 is configured to modify the content request to generate a modified content request. The modified content request is indicative of a network location of the zone-specific proxy 204. As described above, the network location of the zone-specific proxy 204 is located between the mobile terminal 102 and a core network. The zone-specific proxy 204 is further configured to transmit the modified content request to the CDN server 108. Thus, the modified content request may be transmitted to the CDN server 108 via the core network. Modifying the content request may include adding a global IP address of the zone-specific proxy 204 to the content request, for example by adding the global IP address to an additional section of a domain name service (DNS) request, replacing an option of a DNS request with the global IP address, and/or adding the global IP address to a hypertext transfer protocol (HTTP) header of an HTTP request.

The zone-specific proxy 204 may be further configured to receive a content response from the CDN server 108 in response to transmitting the modified content request. The content response is indicative of the address of the network content resource. The zone-specific proxy 204 may be further configured to modify the content response to generate a modified content response that is indicative of the mobile terminal 102 and to transmit the modified content response to the mobile terminal 102. Modifying the content request may include replacing a source IP address of the content request with a global IP address of the zone-specific proxy 204, and modifying the content response may include replacing a destination IP address of the content response with an IP address of the mobile terminal 102. As described above, the content request may include a DNS request or an HTTP request, and the content response may include a DNS response or an HTTP response.

The surrogate CDN server 206 is configured to store content 180 that is deployed by the CDN server 108. The surrogate CDN server 206 is further configured to provide the content 180 to the mobile terminal 102 in response to receiving a content access.

Figure 3:
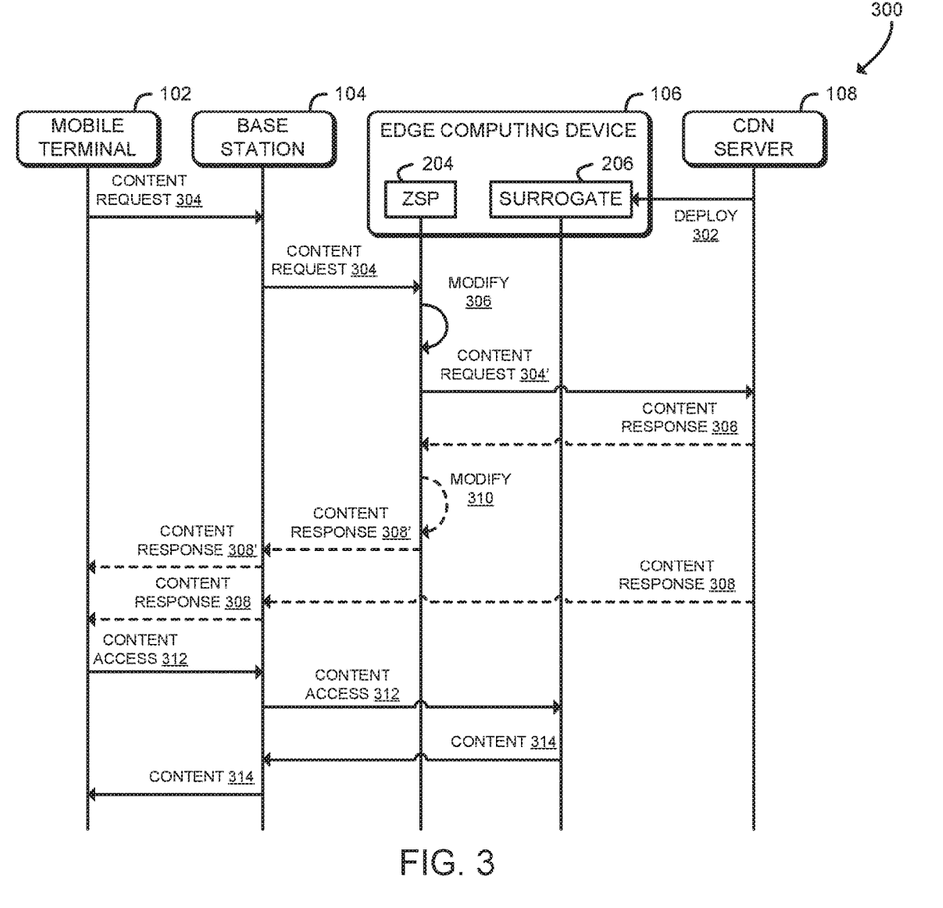
FIG. 3 is a simplified interaction diagram of at least one embodiment of a method for edge-based content delivery that may be executed by the system of FIGS. 1-2.

Referring now to FIG. 3, an interaction diagram 300 illustrates a method for edge-based content delivery that may be executed by the system 100. As shown, the CDN server 108 deploys 302 content 180 to the surrogate CDN server 206. The CDN server 108 may also update the content deployment database 182 to record a mapping between the zone-specific proxy 204 and the surrogate CDN server 206. The CDN server 108 may be embodied as or otherwise include a global server load balance (GSLB) or other distribution management component of the CDN system, and the content 180 may be deployed to the surrogate CDN server 206 using the architecture of the CDN system of the CDN server 108. Additionally, although illustrated as deploying 302 the content 180 prior to processing any content requests, it should be understood that in some embodiments, the deployment 302 may also occur at other times, for example on demand, in response to content updates, or otherwise. Similarly, although described as establishing the mapping between the zone-specific proxy 204 and the surrogate CDN server 206 during the deployment 302, it should be understood that in some embodiments the mapping may be determined on demand or at other times.

As shown, the mobile terminal 102 sends a content request 304 to the base station 104. As described above, the content request 304 identifies a network content resource (e.g., a particular file, entity, or other item of the content 180). The base station 104 forwards the content request 304 to the zone-specific proxy 204. The zone-specific proxy 204 modifies 306 the content request 304 to generate a modified content request 304'. As described above, the modified content request 304' identifies the network location of the zone-specific proxy 204. The zone-specific proxy 204 sends the modified content request 304' to the CDN server 108.

In response to receiving the modified content request 304', the CDN server 108 identifies a surrogate CDN server 206. For example, the CDN server 108 may look up a mapping between the zone-specific proxy 204 and the surrogate CDN server 206 in the content deployment database 182. The CDN server 108 sends a content response 308 to the zone-specific proxy 204 or, in some embodiments, to the base station 104 (which transmits the content response 308 to the mobile terminal 102). The content response 308 indicates the address of a network resource (i.e., the address of the appropriate surrogate CDN server 206).

In some embodiments, the zone-specific proxy 204 may receive the content response 308. The zone-specific proxy 204 modifies 310 the content response 308 to generate a modified content response 308'. The modified content response 308' identifies the mobile terminal 102. The zone-specific proxy 204 sends the modified content response 308' to the base station 104, which sends the modified content response 308' to the mobile terminal 102.

In response to receiving a content response 308 or modified content response 308', the mobile terminal 102 sends a content access 312 to the base station 104. The content access identifies or is otherwise associated with the network address of the network content resource. The base station 104 forwards the content access 312 to the surrogate CDN server 206. The surrogate CDN server 206 sends the network content resource 314 to the base station 104 in response, and the base station 104 sends the network content resource 314 to the mobile terminal 102.

Figure 4:
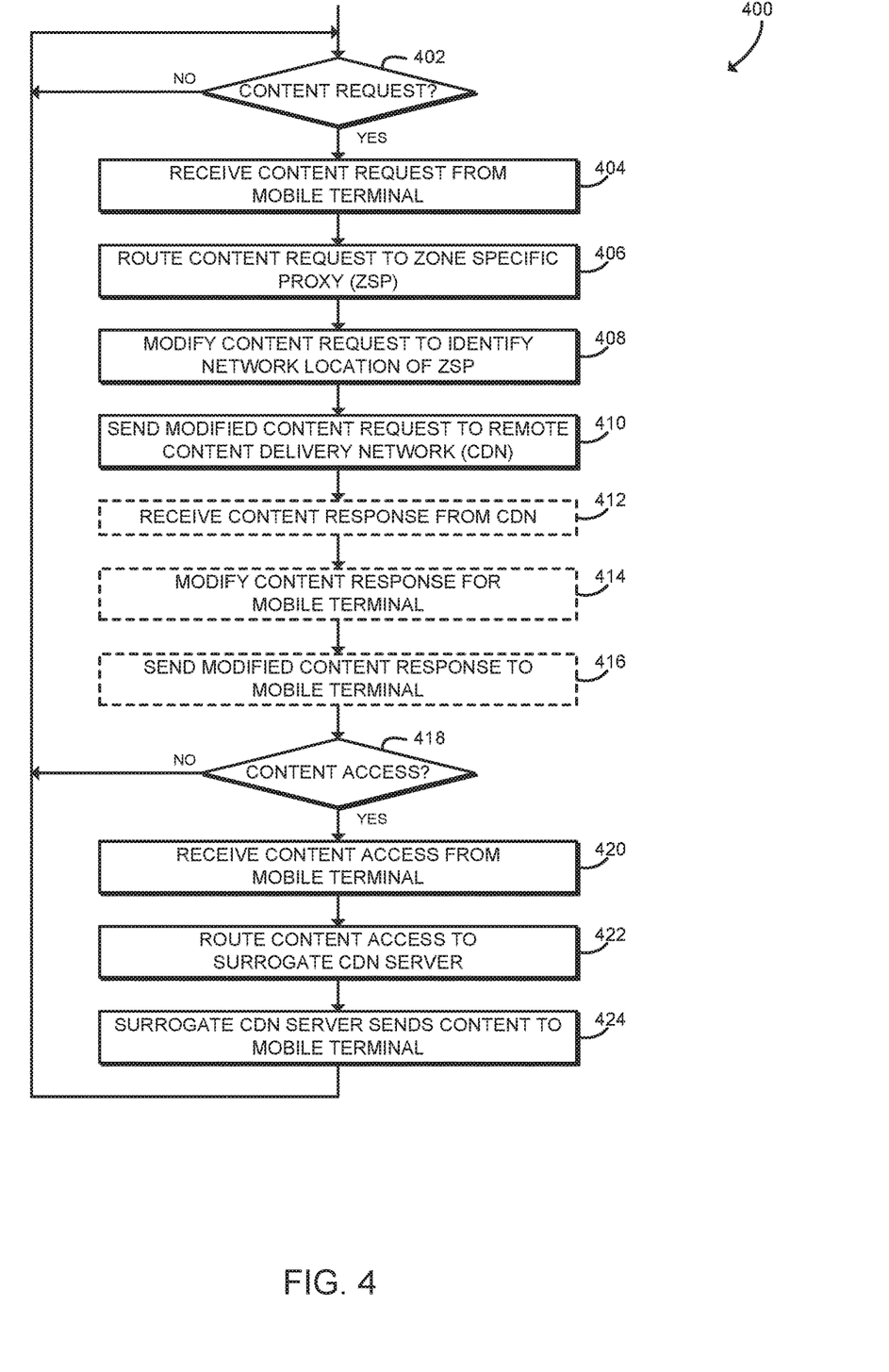
FIG. 4 is a simplified flow diagram of at least one embodiment of a method for edge-based content delivery that may be performed by the edge computing device of FIGS. 1-2.

Referring now to FIG. 4, in use, the edge computing device 106 may execute a method 400 for edge-based content delivery. It should be appreciated that, in some embodiments, the operations of the method 400 may be performed by one or more components of the environment 200 of the edge computing device 106 as shown in FIG. 2. The method 400 begins in block 402, in which the edge computing device 106 determines whether a content request has been received from a mobile terminal 102. If not, the method 400 loops back to block 402 to continue monitoring for content requests. If a content request has been received, the method 400 advances to block 404.

In block 404, the edge computing device 106 receives a content request from the mobile terminal 102. The content request may be embodied as any request that identifies a network content resource requested by the mobile terminal 102. The content request may include a uniform resource indicator (URI), uniform resource locator (URL), or other uniform symbolic identifier of the requested content and/or of a host or domain associated with the requested content. For example, the content request may be embodied as a DNS request. In some embodiments, the content request may be embodied as an HTTPDNS request, which is a request that uses the HTTP protocol to access DNS information. For example, an HTTP request may include host names to be resolved in the body of an HTTP POST request.

In block 406, the edge computing device 106 routes the content request to the zone-specific proxy 204 executed by the edge computing device 106. For example, the edge computing device 106 may include a data plane or other network traffic routing infrastructure. The data plane may be configured with one or more traffic rules that identify content requests (e.g., DNS requests, HTTPDNS requests, or other requests) and forwards the content requests to the zone-specific proxy 204. As described above, the zone-specific proxy 204 may be embodied as a VM, VNF, or other virtualized workload that is capable of processing network traffic. Using the data plane to route matching traffic may allow the zone-specific proxy 204 to process only sessions related to server resolution (e.g., DNS request/response) rather than tracking all service sessions (e.g., video streaming traffic). Processing only server resolution traffic may also reduce hardware/processing requirements of the zone-specific proxy 204.

In block 408, the zone-specific proxy 204 of the edge computing device 106 modifies the content request to identify the network location of the zone-specific proxy 204. For example, the content request may be modified to include a global IP address of the zone-specific proxy 204. Embodiments of various techniques for modifying the content request are described further below in connection with FIGS. 5-9.

In block 410, the edge computing device 106 sends the modified content request to the CDN server 108. As described above, the CDN server 108 may be embodied as or otherwise include a global server load balance (GSLB). Based on the network location (e.g., IP address) of the zone-specific proxy 204, the GSLB identifies the surrogate CDN server 206 hosted by the edge computing device 106. The CDN server 108 responds with a content response that provides a network address for the requested content, which points to the surrogate CDN server 206. As described above, the CDN server 108 may send the content response to the zone-specific proxy 204 or directly to the mobile terminal 102 (via the base station 104). Embodiments of various techniques that result in the CDN server 108 sending the response to the zone-specific proxy 204 are described below in connection with FIGS. 5 and 7. Embodiments of various techniques that result in the CDN server 108 sending the response to the mobile terminal 102 are described below in connection with FIGS. 6 and 8-9.

In some embodiments, in block 412 the zone-specific proxy 204 may receive a content response from the CDN server 108. The content response may identify a network address of the requested content resource. For example, the content response may identify an IP address or other network address of the surrogate CDN server 206. In some embodiments, the content response may be embodied as a DNS response or an HTTP response. In block 414, in some embodiments the zone-specific proxy 204 may modify the content response for the mobile terminal 102. For example, the zone-specific proxy 204 may modify the content response to include an IP address of the mobile terminal 102. In block 416, the zone-specific proxy 204 sends the modified content response to the mobile terminal 102.

In block 418, the edge computing device 106 determines whether a content access has been received from the mobile terminal 102. If not, the method 400 loops back to block 402 to continue monitoring for content requests and/or content accesses. If a content access has been received, the method 400 advances to block 420.

In block 420, the edge computing device 106 receives a content access from the mobile terminal 102. The content access may be embodied as any request that identifies or is otherwise associated with the address of the network content resource that is requested by the mobile terminal 102. For example, the content access may be embodied as an HTTP request or other request to download the content to the mobile terminal 102.

In block 422, the edge computing device 106 routes the content access to the surrogate CDN server 206 executed by the edge computing device 106. For example, the data plane of the edge computing device 106 may be configured with one or more traffic rules that identify content accesses (e.g., HTTP requests) and forwards the content accesses to the surrogate CDN server 206. As described above, the surrogate CDN server 206 may be embodied as a VM, VNF, or other virtualized workload that is capable of processing network traffic. In block 424, the surrogate CDN server 206 sends the requested network content resource to the mobile terminal 102. After sending the content, the method 400 loops back to block 402 to process additional content requests and/or content accesses.

Figure 5:
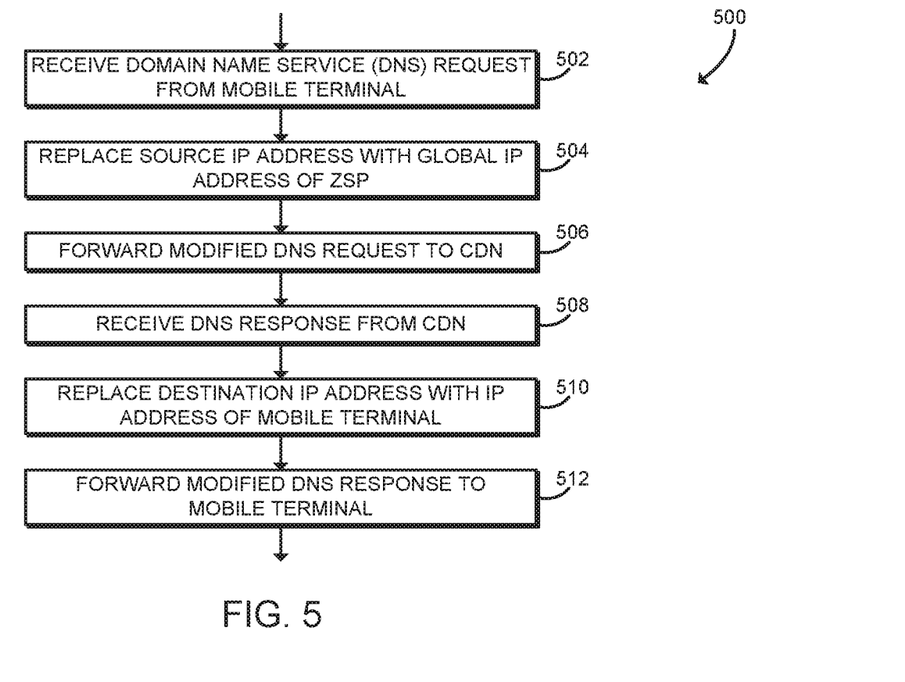
FIG. 5 is a simplified flow diagram of at least one embodiment of a method for processing content requests and content responses that may be executed by the edge computing device of FIGS. 1-2.

Referring now to FIG. 5, in use, the edge computing device 106 may execute a method 500 for processing content requests and content responses. As described above, the method 500 may be executed in connection with blocks 404 to 416 of FIG. 4. It should be appreciated that, in some embodiments, the operations of the method 500 may be performed by one or more components of the environment 200 of the edge computing device 106 as shown in FIG. 2. The method 500 begins in block 502, in which the edge computing device 106 receives a DNS request from the mobile terminal 102. In block 504, the zone-specific proxy 204 of the edge computing device 106 replaces the source IP address of the DNS request with the global IP address of the zone-specific proxy 204. In block 506, the zone-specific proxy 204 forwards the modified DNS request to the CDN server 108. The CDN server 108 uses the source IP address of the DNS request (which identifies the zone-specific proxy 204) to identify an appropriate surrogate CDN server 206.

In block 508, the zone-specific proxy 204 receives a DNS response from the CDN server 108. The DNS response may include or otherwise identify an IP address of the surrogate CDN server 206 executed by the edge computing device 106. In block 510, the zone-specific proxy 204 replaces the destination IP address of the DNS response with the IP address of the mobile terminal 102. In block 512, the zone-specific proxy 204 forwards the modified DNS response to the mobile terminal 102. After forwarding the modified DNS response, the method 500 is complete. The method 500 may be executed multiple times to process multiple content requests.

Figure 6:
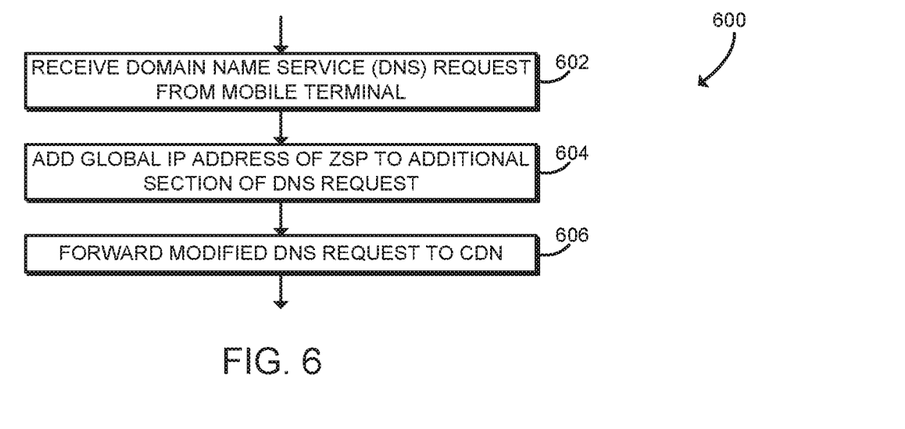
FIG. 6 is a simplified flow diagram of at least one embodiment of a method for processing content requests that may be executed by the edge computing device of FIGS. 1-2.

Referring now to FIG. 6, in use, the edge computing device 106 may execute a method 600 for processing content requests. As described above, the method 600 may be executed in connection with blocks 404 to 410 of FIG. 4. It should be appreciated that, in some embodiments, the operations of the method 600 may be performed by one or more components of the environment 200 of the edge computing device 106 as shown in FIG. 2. The method 600 begins in block 602, in which the edge computing device 106 receives a DNS request from the mobile terminal 102. In block 604, the zone-specific proxy 204 adds the global IP address of the zone-specific proxy 204 to an "Additional" section of the DNS request. In block 606, the zone-specific proxy 204 forwards the modified DNS request to the CDN server 108. The CDN server 108 uses the global IP address of the zone-specific proxy 204, stored in the Additional section, to identify an appropriate surrogate CDN server 206. The CDN server 108 sends a DNS response directly to the mobile terminal 102. After forwarding the modified DNS request, the method 600 is complete. The method 600 may be executed multiple times to process multiple content requests.

Figure 7:
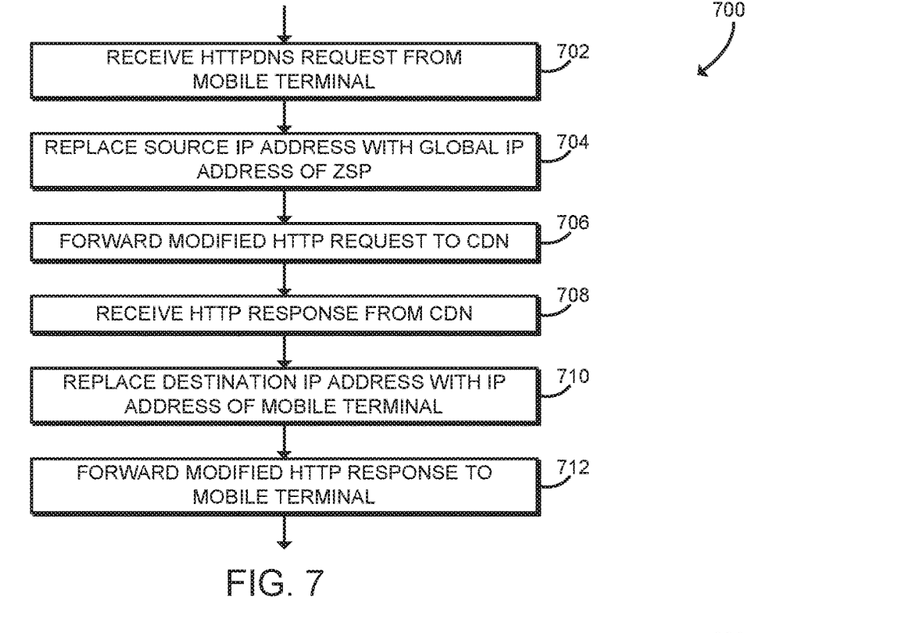
FIG. 7 is a simplified flow diagram of at least one embodiment of a method for processing content requests and content responses that may be executed by the edge computing device of FIGS. 1-2.

Referring now to FIG. 7, in use, the edge computing device 106 may execute a method 700 for processing content requests and content responses. As described above, the method 700 may be executed in connection with blocks 404 to 416 of FIG. 4. It should be appreciated that, in some embodiments, the operations of the method 700 may be performed by one or more components of the environment 200 of the edge computing device 106 as shown in FIG. 2. The method 700 begins in block 702, in which the edge computing device 106 receives an HTTPDNS request from the mobile terminal 102. In block 704, the zone-specific proxy 204 of the edge computing device 106 replaces the source IP address of the HTTPDNS request with the global IP address of the zone-specific proxy 204. In block 706, the zone-specific proxy 204 forwards the modified HTTPDNS request to the CDN server 108. The CDN server 108 uses the source IP address of the HTTPDNS request (which identifies the zone-specific proxy 204) to identify an appropriate surrogate CDN server 206.

In block 708, the zone-specific proxy 204 receives an HTTP response from the CDN server 108. The HTTP response may include or otherwise identify an IP address of the surrogate CDN server 206 executed by the edge computing device 106. For example, the HTTP response may include JSON data or other structured data in a body of the HTTP response. In block 710, the zone-specific proxy 204 replaces the destination IP address of the HTTP response with the IP address of the mobile terminal 102. In block 712, the zone-specific proxy 204 forwards the modified HTTP response to the mobile terminal 102. After forwarding the modified HTTP response, the method 700 is complete. The method 700 may be executed multiple times to process multiple content requests.

Figure 8:
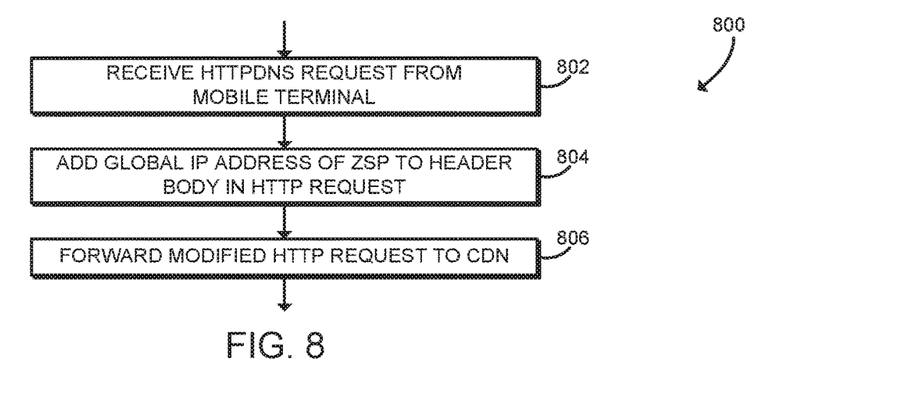
FIG. 8 is a simplified flow diagram of at least one embodiment of a method for processing content requests that may be executed by the edge computing device of FIGS. 1-2.

Referring now to FIG. 8, in use, the edge computing device 106 may execute a method 800 for processing content requests. As described above, the method 800 may be executed in connection with blocks 404 to 410 of FIG. 4. It should be appreciated that, in some embodiments, the operations of the method 800 may be performed by one or more components of the environment 200 of the edge computing device 106 as shown in FIG. 2. The method 800 begins in block 802, in which the edge computing device 106 receives an HTTPDNS request from the mobile terminal 102. In block 804, the zone-specific proxy 204 of the edge computing device 106 adds the global IP address of the zone-specific proxy 204 to a header body of the HTTP request. In block 806, the zone-specific proxy 204 forwards the modified HTTPDNS request to the CDN server 108. The CDN server 108 uses the global IP address of the zone-specific proxy 204, stored in the HTTP header, to identify an appropriate surrogate CDN server 206. The CDN server 108 sends an HTTP response directly to the mobile terminal 102. After forwarding the modified HTTP request, the method 800 is complete. The method 800 may be executed multiple times to process multiple content requests.

Figure 9:
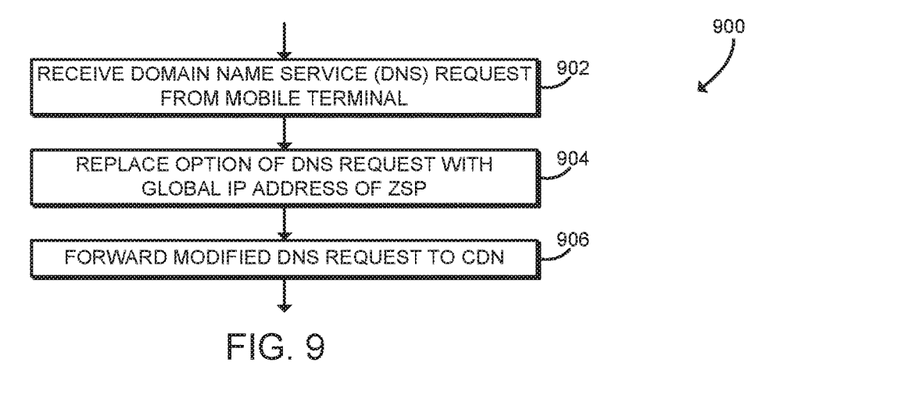
FIG. 9 is a simplified flow diagram of at least one embodiment of a method for processing content requests that may be executed by the edge computing device of FIGS. 1-2.

Referring now to FIG. 9, in use, the edge computing device 106 may execute a method 900 for processing content requests. As described above, the method 900 may be executed in connection with blocks 404 to 410 of FIG. 4. It should be appreciated that, in some embodiments, the operations of the method 900 may be performed by one or more components of the environment 200 of the edge computing device 106 as shown in FIG. 2. The method 900 begins in block 902, in which the edge computing device 106 receives a DNS request from the mobile terminal 102. In block 904, the zone-specific proxy 204 replaces an "Option" of the DNS request with the global IP address of the zone-specific proxy 204. For example, the DNS request may include one or more extension mechanisms for DNS (EDNS) client subnet (ECS) options. The zone-specific proxy 204 may replace one or more ECS options with the global IP address of the zone-specific proxy 204. In block 906, the zone-specific proxy 204 forwards the modified DNS request to the CDN server 108. The CDN server 108 uses the global IP address of the zone-specific proxy 204, stored in the Option, to identify an appropriate surrogate CDN server 206. The CDN server 108 sends a DNS response directly to the mobile terminal 102. After forwarding the modified DNS request, the method 900 is complete. The method 900 may be executed again to process additional content requests.

It should be appreciated that, in some embodiments, the methods 400, 500, 600, 700, and/or 900 may be embodied as various instructions stored on a computer-readable media, which may be executed by the processor 120, the I/O subsystem 122, the communication subsystem 128, and/or other components of the edge computing device 106 to cause the edge computing device 106 to perform the respective method 400, 500, 600, 700, and/or 900. The computer-readable media may be embodied as any type of media capable of being read by the edge computing device 106 including, but not limited to, the memory 124, the data storage device 126, firmware devices, and/or other media.

It should be understood that in some embodiments, various architectural elements of the system 100 may be distributed, for example using internet of things (IoT) devices and use cases. IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

An example domain topology may include respective internet-of-things (IoT) networks coupled through links to respective gateways. Illustratively, architectural elements of the system 100, such as the mobile terminal 102, base station 104, edge computing device 106, and/or content delivery server 108 may be distributed among various IoT devices and IoT gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

A domain topology that may be used for a number of internet-of-things (IoT) networks may include multiple IoT devices, with multiple IoT networks coupled through backbone links to respective gateways. The backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/deMUXing components that facilitate interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide area (LPWA) network, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Communications in the cellular network, for instance, may be enhanced by systems that offload data, extend communications to more remote devices, or both. The LPWA network may include systems that perform non-Internet protocol (IP) to IP interconnections, addressing, and routing. Further, each of the IoT devices may include the appropriate transceiver for wide area communications with that device. Further, each IoT device may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device.

For example, a cloud computing network may be in communication with a mesh network of IoT devices operating as a fog device at the edge of the cloud computing network. Illustratively, the fog device may perform functions of the edge computing device 106. The fog may be considered to be a massively interconnected network wherein a number of IoT devices are in communications with each other, for example, by radio links. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

The illustrative fog may include IoT devices such as gateways, data aggregators, and sensors, although any combinations of IoT devices and functionality may be used. The gateways may be edge devices that provide communications between the cloud and the fog, and may also provide the backend process function for data obtained from sensors, such as motion data, flow data, temperature data, and the like. The data aggregators may collect data from any number of the sensors, and perform the back end processing function for the analysis. The results, raw data, or both may be passed along to the cloud through the gateways. The sensors may be full IoT devices, for example, capable of both collecting data and processing the data. In some cases, the sensors may be more limited in functionality, for example, collecting the data and allowing the data aggregators or gateways to process the data.

Communications from any IoT device may be passed along a convenient path (e.g., a most convenient path) between any of the IoT devices to reach the gateways. In these networks, the number of interconnections provide substantial redundancy, allowing communications to be maintained, even with the loss of a number of IoT devices. Further, the use of a mesh network may allow IoT devices that are very low power or located at a distance from infrastructure to be used, as the range to connect to another IoT device may be much less than the range to connect to the gateways.

The fog provided from these IoT devices may be presented to devices in the cloud, such as a server, as a single device located at the edge of the cloud, e.g., a fog device. In this example, the alerts coming from the fog device may be sent without being identified as coming from a specific IoT device within the fog. In this fashion, the fog may be considered a distributed platform that provides computing and storage resources to perform processing or data-intensive tasks such as data analytics, data aggregation, and machine-learning, among others.

In some examples, the IoT devices may be configured using an imperative programming style, e.g., with each IoT device having a specific function and communication partners. However, the IoT devices forming the fog device may be configured in a declarative programming style, allowing the IoT devices to reconfigure their operations and communications, such as to determine needed resources in response to conditions, queries, and device failures. As an example, a query from a user located at a server about the operations of a subset of equipment monitored by the IoT devices may result in the fog device selecting the IoT devices, such as particular sensors, needed to answer the query. The data from these sensors may then be aggregated and analyzed by any combination of the sensors, data aggregators, or gateways, before being sent on by the fog device to the server to answer the query. In this example, IoT devices in the fog may select the sensors used based on the query, such as adding data from flow sensors or temperature sensors. Further, if some of the IoT devices are not operational, other IoT devices in the fog device may provide analogous data, if available.

Examples

Illustrative examples of the technologies disclosed herein are provided below. An embodiment of the technologies may include any one or more, and any combination of, the examples described below.

Example 1 includes an edge computing device for mobile content delivery, the edge computing device comprising: a multiple access framework to receive a content request from a mobile terminal, wherein the content request is associated with an identifier of a network content resource; and a zone specific proxy to (i) modify the content request to generate a modified content request, wherein the modified content request is indicative of a network location of the zone specific proxy; and (ii) transmit the modified content request to a content delivery network server.

Example 2 includes the subject matter of Example 1, and wherein: the network location of the zone specific proxy is located between the mobile terminal and a core network; and to transmit the modified content request to the content delivery network server comprises to transmit the modified content request to the content delivery network server via the core network.

Example 3 includes the subject matter of any of Examples 1 and 2, and wherein the edge computing device is included in a radio node that is in wireless communication with the mobile terminal.

Example 4 includes the subject matter of any of Examples 1-3, and wherein: the multiple access framework is further to route the content request to the zone specific proxy of the edge computing device, wherein the zone specific proxy comprises a virtual machine executed by the edge computing device; and to modify the content request comprises to modify the content request by the zone specific proxy in response to routing of the content request.

Example 5 includes the subject matter of any of Examples 1-4, and wherein to modify the content request comprises to add a global IP address of the zone specific proxy to the content request.

Example 6 includes the subject matter of any of Examples 1-5, and wherein the content request comprises a DNS request, and wherein to add the global IP address comprises to add the global IP address to an additional section of the DNS request.

Example 7 includes the subject matter of any of Examples 1-6, and wherein the content request comprises a DNS request, and wherein to add the global IP address comprises to replace an option of the DNS request with the global IP address.

Example 8 includes the subject matter of any of Examples 1-7, and wherein the content request comprises an HTTP request and wherein to add the global IP address comprises to add the global IP address to an HTTP header of the HTTP request.

Example 9 includes the subject matter of any of Examples 1-8, and wherein the multiple access framework is further to: receive a content access from the mobile terminal in response to transmission of the modified content request, wherein the content access is associated with an address of the network content resource; and route the content access to a surrogate content delivery server of the edge computing device, wherein the surrogate content delivery server comprises a virtual machine executed by the computing device.

Example 10 includes the subject matter of any of Examples 1-9, and wherein the zone specific proxy is further to: receive a content response from the content delivery network server in response to transmission of the modified content request, wherein the content response is indicative of an address of the network content resource; modify the content response to generate a modified content response, wherein the modified content response is indicative of the mobile terminal; and transmit the modified content response to the mobile terminal.

Example 11 includes the subject matter of any of Examples 1-10, and wherein: to modify the content request comprises to replace a source IP address of the content request with a global IP address of the zone specific proxy; and to modify the content response comprises to replace a destination IP address of the content response with an IP address of the mobile terminal.

Example 12 includes the subject matter of any of Examples 1-11, and wherein the content request comprises a DNS request and the content response comprises a DNS response.

Example 13 includes the subject matter of any of Examples 1-12, and wherein the content request comprises an HTTP request and the content response comprises an HTTP response.

Example 14 includes a method for mobile content delivery, the method comprising: receiving, by an edge computing device, a content request from a mobile terminal, wherein the content request is associated with an identifier of a network content resource; modifying, by a zone specific proxy of the edge computing device, the content request to generate a modified content request, wherein the modified content request is indicative of a network location of the zone specific proxy of the edge computing device; and transmitting, by the zone specific proxy, the modified content request to a content delivery network server.

Example 15 includes the subject matter of Example 14, and wherein: the network location of the zone specific proxy is located between the mobile terminal and a core network; and transmitting the modified content request to the content delivery network server comprises transmitting the modified content request to the content delivery network server via the core network.

Example 16 includes the subject matter of any of Examples 14 and 15, and wherein the edge computing device is included in a radio node that is in wireless communication with the mobile terminal.

Example 17 includes the subject matter of any of Examples 14-16, and further comprising: routing, by the edge computing device, the content request to the zone specific proxy of the edge computing device, wherein the zone specific proxy comprises a virtual machine executed by the edge computing device; wherein modifying the content request comprises modifying the content request by the zone specific proxy in response to routing the content request.

Example 18 includes the subject matter of any of Examples 14-17, and wherein modifying the content request comprises adding a global IP address of the zone specific proxy to the content request.

Example 19 includes the subject matter of any of Examples 14-18, and wherein the content request comprises a DNS request, and wherein adding the global IP address comprises adding the global IP address to an additional section of the DNS request.

Example 20 includes the subject matter of any of Examples 14-19, and further comprising: receiving, by the edge computing device, a content access from the mobile terminal in response to transmitting the modified content request, wherein the content access is associated with an address of the network content resource; and routing, by the edge computing device, the content access to a surrogate content delivery server of the edge computing device, wherein the surrogate content delivery server comprises a virtual machine executed by the computing device.

Example 21 includes the subject matter of any of Examples 14-20, and further comprising: receiving, by the zone specific proxy, a content response from the content delivery network server in response to transmitting the modified content request, wherein the content response is indicative of an address of the network content resource; modifying, by the zone specific proxy, the content response to generate a modified content response, wherein the modified content response is indicative of the mobile terminal; and transmitting, by the zone specific proxy, the modified content response to the mobile terminal.

Example 22 includes the subject matter of any of Examples 14-21, and wherein: modifying the content request comprises replacing a source IP address of the content request with a global IP address of the zone specific proxy; and modifying the content response comprises replacing a destination IP address of the content response with an IP address of the mobile terminal.

Example 23 includes a computing device comprising: a processor; and a memory having stored therein a plurality of instructions that when executed by the processor cause the computing device to perform the method of any of Examples 14-22.

Example 24 includes one or more non-transitory, computer readable storage media comprising a plurality of instructions stored thereon that in response to being executed result in a computing device performing the method of any of Examples 14-22.

Example 25 includes a computing device comprising means for performing the method of any of Examples 14-22.

The invention claimed is:

1. An edge computing device for mobile content delivery, the edge computing device comprising:
   a multiple access framework to receive a content request from a mobile terminal, wherein the content request is associated with an identifier of a network content resource; and
   a zone specific proxy to (i) modify the content request to generate a modified content request, wherein the modified content request is indicative of a network location of the zone specific proxy; and (ii) transmit the modified content request to a content delivery network server.

2. The edge computing device of claim 1, wherein:
   the network location of the zone specific proxy is located between the mobile terminal and a core network;
   to transmit the modified content request to the content delivery network server comprises to transmit the modified content request to the content delivery network server via the core network.

3. The edge computing device of claim 1, wherein:
   the multiple access framework is further to route the content request to the zone specific proxy of the edge computing device, wherein the zone specific proxy comprises a virtual machine executed by the edge computing device; and
   to modify the content request comprises to modify the content request by the zone specific proxy in response to routing of the content request.

4. The edge computing device of claim 3, wherein to modify the content request comprises to add a global IP address of the zone specific proxy to the content request.

5. The edge computing device of claim 4, wherein the content request comprises a DNS request, and wherein to add the global IP address comprises to add the global IP address to an additional section of the DNS request.

6. The edge computing device of claim 4, wherein the content request comprises a DNS request, and wherein to add the global IP address comprises to replace an option of the DNS request with the global IP address.

7. The edge computing device of claim 4, wherein the content request comprises an HTTP request and wherein to add the global IP address comprises to add the global IP address to an HTTP header of the HTTP request.

8. The edge computing device of claim 1, wherein the multiple access framework is further to:
   receive a content access from the mobile terminal in response to transmission of the modified content request, wherein the content access is associated with an address of the network content resource; and
   route the content access to a surrogate content delivery server of the edge computing device, wherein the surrogate content delivery server comprises a virtual machine executed by the computing device.

9. The edge computing device of claim 1, wherein the zone specific proxy is further to:
   receive a content response from the content delivery network server in response to transmission of the modified content request, wherein the content response is indicative of an address of the network content resource;
   modify the content response to generate a modified content response, wherein the modified content response is indicative of the mobile terminal; and
   transmit the modified content response to the mobile terminal.

10. The edge computing device of claim 9, wherein:
    to modify the content request comprises to replace a source IP address of the content request with a global IP address of the zone specific proxy; and
    to modify the content response comprises to replace a destination IP address of the content response with an IP address of the mobile terminal.

11. A method for mobile content delivery, the method comprising:
    receiving, by an edge computing device, a content request from a mobile terminal, wherein the content request is associated with an identifier of a network content resource;
    modifying, by a zone specific proxy of the edge computing device, the content request to generate a modified content request, wherein the modified content request is indicative of a network location of the zone specific proxy of the edge computing device; and
    transmitting, by the zone specific proxy, the modified content request to a content delivery network server.

12. The method of claim 11, wherein:
    the network location of the zone specific proxy is located between the mobile terminal and a core network; and
    transmitting the modified content request to the content delivery network server comprises transmitting the modified content request to the content delivery network server via the core network.

13. The method of claim 11, further comprising:
    routing, by the edge computing device, the content request to the zone specific proxy of the edge computing device, wherein the zone specific proxy comprises a virtual machine executed by the edge computing device;

wherein modifying the content request comprises modifying the content request by the zone specific proxy in response to routing the content request.

14. The method of claim 13, wherein modifying the content request comprises adding a global IP address of the zone specific proxy to the content request.

15. The method of claim 14, wherein the content request comprises a DNS request, and wherein adding the global IP address comprises adding the global IP address to an additional section of the DNS request.

16. The method of claim 11, further comprising:
receiving, by the edge computing device, a content access from the mobile terminal in response to transmitting the modified content request, wherein the content access is associated with an address of the network content resource; and
routing, by the edge computing device, the content access to a surrogate content delivery server of the edge computing device, wherein the surrogate content delivery server comprises a virtual machine executed by the computing device.

17. The method of claim 11, further comprising:
receiving, by the zone specific proxy, a content response from the content delivery network server in response to transmitting the modified content request, wherein the content response is indicative of an address of the network content resource;
modifying, by the zone specific proxy, the content response to generate a modified content response, wherein the modified content response is indicative of the mobile terminal; and
transmitting, by the zone specific proxy, the modified content response to the mobile terminal.

18. One or more non-transitory, computer-readable storage media comprising a plurality of instructions stored thereon that, when executed, cause an edge computing device to:
receive a content request from a mobile terminal, wherein the content request is associated with an identifier of a network content resource;
modify, by a zone specific proxy of the edge computing device, the content request to generate a modified content request, wherein the modified content request is indicative of a network location of the zone specific proxy of the edge computing device; and
transmit, by the zone specific proxy, the modified content request to a content delivery network server.

19. The one or more non-transitory, computer-readable storage media of claim 18, wherein:
the network location of the zone specific proxy is located between the mobile terminal and a core network; and
to transmit the modified content request to the content delivery network server comprises to transmit the modified content request to the content delivery network server via the core network.

20. The one or more non-transitory, computer-readable storage media of claim 18, wherein the plurality of instructions, when executed, further cause the edge computing device to:
route the content request to the zone specific proxy of the edge computing device, wherein the zone specific proxy comprises a virtual machine executed by the edge computing device;
wherein to modify the content request comprises to modify the content request by the zone specific proxy in response to routing the content request.

21. The one or more non-transitory, computer-readable storage media of claim 20, wherein to modify the content request comprises to add a global IP address of the zone specific proxy to the content request.

22. The one or more non-transitory, computer-readable storage media of claim 21, wherein the content request comprises a DNS request, and wherein to add the global IP address comprises to add the global IP address to an additional section of the DNS request.

23. The one or more non-transitory, computer-readable storage media of claim 18, wherein the plurality of instructions, when executed, further cause the edge computing device to:
receive a content access from the mobile terminal in response to transmission of the modified content request, wherein the content access is associated with an address of the network content resource; and
route the content access to a surrogate content delivery server of the edge computing device, wherein the surrogate content delivery server comprises a virtual machine executed by the computing device.

24. The one or more non-transitory, computer-readable storage media of claim 18, wherein the plurality of instructions, when executed, further cause the edge computing device to:
receive, by the zone specific proxy, a content response from the content delivery network server in response to transmitting the modified content request, wherein the content response is indicative of an address of the network content resource;
modify, by the zone specific proxy, the content response to generate a modified content response, wherein the modified content response is indicative of the mobile terminal; and
transmit, by the zone specific proxy, the modified content response to the mobile terminal.

* * * * *